(12) United States Patent
Meyer

(10) Patent No.: US 10,972,636 B2
(45) Date of Patent: Apr. 6, 2021

(54) PRECISION TIMING FOR BROADCAST NETWORK

(71) Applicant: GVBB HOLDINGS S.A.R.L., Luxembourg (LU)

(72) Inventor: Charles S. Meyer, Crystal Bay, NV (US)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 16/657,374

(22) Filed: Oct. 18, 2019

(65) Prior Publication Data

US 2020/0162640 A1 May 21, 2020

Related U.S. Application Data

(63) Continuation of application No. 15/796,461, filed on Oct. 27, 2017, now Pat. No. 10,455,126, which is a continuation of application No. 15/094,981, filed on Apr. 8, 2016, now Pat. No. 9,838,571.

(60) Provisional application No. 62/146,203, filed on Apr. 10, 2015.

(51) Int. Cl.
| | |
|---|---|
| *H04N 5/04* | (2006.01) |
| *H04N 21/242* | (2011.01) |
| *H04J 3/06* | (2006.01) |
| *H04L 7/033* | (2006.01) |

(52) U.S. Cl.
CPC .............. *H04N 5/04* (2013.01); *H04J 3/0667* (2013.01); *H04N 21/242* (2013.01); *H04L 7/033* (2013.01)

(58) Field of Classification Search
CPC ....... H04N 5/04; H04N 21/242; H04J 3/0667; H04L 7/033
See application file for complete search history.

(56) References Cited

U.S. PATENT DOCUMENTS

| | | |
|---|---|---|
| 5,394,556 A | 2/1995 | Oprescu |
| 5,984,512 A | 11/1999 | Jones et al. |
| 6,101,195 A | 8/2000 | Lyons et al. |
| 6,611,537 B1 | 8/2003 | Edens et al. |
| 7,502,070 B2 | 3/2009 | Yamaguchi et al. |
| 7,673,321 B2 | 3/2010 | Yurt et al. |

(Continued)

FOREIGN PATENT DOCUMENTS

EP 2595331 A2 5/2013

OTHER PUBLICATIONS

International Search Report and Written Opinion in corresponding PCT application No. PCT/EP2016/057865 dated Jun. 29, 2016.

*Primary Examiner* — Michael E Teitelbaum

(74) *Attorney, Agent, or Firm* — Arent Fox LLP

(57) ABSTRACT

The present aspects relate to techniques of timing synchronization of audio and video (AV) data in a network. In particular, the techniques for a AV master to distribute AV data encoded with one or more time markers to a plurality of processing nodes. The one or more time markers may be indexed to a precision time protocol (PTP) time stamp used as a time reference. In one technique, the nodes extract the time markers to determine an offset value that is applied to a PLL to synchronize AV data packets at a distribution node or a processing node. In another technique the distribution node or the processing node determines the worst case path, which corresponds to a system offset value. The distribution node then reports the system offset value to the AV master, which in turn adjusts the phase based on the report.

30 Claims, 5 Drawing Sheets

(56) References Cited

U.S. PATENT DOCUMENTS

| | | |
|---|---|---|
| 7,729,381 B2 | 6/2010 | Savoor et al. |
| 7,899,006 B2 | 3/2011 | Boyd |
| 7,912,219 B1 | 3/2011 | Michener et al. |
| 8,046,792 B2 | 10/2011 | Seidel et al. |
| 8,171,152 B2 | 5/2012 | White et al. |
| 8,270,910 B2 | 9/2012 | Picard |
| 8,279,773 B2 | 10/2012 | Song et al. |
| 8,428,045 B2 | 4/2013 | Gelter et al. |
| 8,555,328 B2 | 10/2013 | Emura |
| 8,630,315 B2 | 1/2014 | Rivaud et al. |
| 8,644,316 B2 | 2/2014 | Savoor et al. |
| 8,750,282 B2 | 6/2014 | Gelter et al. |
| 8,923,367 B2 | 12/2014 | Okuda |
| 8,994,879 B2 | 3/2015 | Richardson et al. |
| 2002/0001309 A1 | 1/2002 | Saito |
| 2002/0087999 A1 | 7/2002 | Kashima |
| 2003/0043902 A1 | 3/2003 | Yurt et al. |
| 2003/0066094 A1 | 4/2003 | Van Der Schaar et al. |
| 2003/0128294 A1 | 7/2003 | Lundblad et al. |
| 2004/0117831 A1 | 6/2004 | Ellis et al. |
| 2005/0219366 A1 | 10/2005 | Hollowbush et al. |
| 2006/0140079 A1 | 6/2006 | Hamada et al. |
| 2008/0084330 A1 | 4/2008 | Picard |
| 2008/0117937 A1 | 5/2008 | Firestone et al. |
| 2008/0144493 A1 | 6/2008 | Yeh et al. |
| 2008/0172708 A1 | 7/2008 | Perry et al. |
| 2008/0186906 A1 | 8/2008 | Defrance et al. |
| 2009/0192639 A1 | 7/2009 | Cellier et al. |
| 2009/0204842 A1 | 8/2009 | Tetik et al. |
| 2010/0067531 A1 | 3/2010 | Thiems et al. |
| 2010/0257280 A1 | 10/2010 | Stokking et al. |
| 2010/0274972 A1 | 10/2010 | Babayan et al. |
| 2012/0063603 A1 | 3/2012 | Evans et al. |
| 2012/0137013 A1 | 5/2012 | Steindl |
| 2012/0162512 A1 | 6/2012 | Johnson et al. |
| 2013/0057761 A1 | 3/2013 | Bloom et al. |
| 2013/0077659 A1 | 3/2013 | Okuda |
| 2013/0083809 A1 | 4/2013 | Renaux et al. |
| 2014/0049689 A1 | 2/2014 | Liang |
| 2014/0089815 A1 | 3/2014 | Gildfind et al. |
| 2014/0226068 A1 | 8/2014 | Lacroix et al. |
| 2014/0244191 A1 | 8/2014 | Oka et al. |
| 2014/0307728 A1 | 10/2014 | Nakajima |
| 2015/0052571 A1 | 2/2015 | Stokking et al. |
| 2015/0245306 A1 | 8/2015 | Boehlke |

PRECISION TIMING FOR BROADCAST NETWORK

CROSS-REFERENCE TO RELATED APPLICATIONS

This application is a continuation application of U.S. application Ser. No. 15/796,461, filed Oct. 27, 2017, which is a continuation of U.S. application Ser. No. 15/094,981, filed Apr. 8, 2016, now issued as U.S. Pat. No. 9,838,571, and which claims the benefit of priority to Provisional Patent Application No. 62/146,203, filed Apr. 10, 2015, the entire contents of each of which are herein incorporated by reference.

BACKGROUND

Television broadcasting involves sending video from a broadcast facility for distribution to receivers in a broadcast network. Within a media production facility that sends a television broadcast, video and audio signals from multiple sources may be managed by productions switches and then encoded for transport to a distribution network. A long standing problem for media broadcasting is to tune and sync frequency and phase of a decoder at a media device (e.g., a distribution node or a processing node such as a video receiver) to a master media timing source (e.g., a transmitter at the source of the media transport). Propagation delays due to electrical connections, device processing, and conductor impedance of network links contribute to phase offset at downstream media devices. As the evolution of broadcasting progressed from analog to digital domain and across various protocols (e.g., MPEG-2, Internet Protocol (IP), IPTV, Ethernet), various techniques have been developed to manage the frequency and phase sync. Local clock references, such a program clock reference (PCR) time stamp or a presentation time stamp, provide no reference to real time. Other protocols, such as precision time protocol (PTP), provide time stamps infrequently, and are slow to converge on a precise phase lock due to the low refresh rate of the time stamp values. Compounding these potential problems with time stamps is where multiple unique time stamps may need to be applied independently to over a hundred audio and video feeds, each having different clock rates and phases.

As such, an efficient method for synchronizing the frequency and phase of devices in a media network that distributes audio and video data packets, such as for live broadcast television programming is desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method for timing synchronization of audio video (AV) data, comprising: receiving the AV data encoded with one or more time markers, wherein the one or more time markers are indexed to a precision time protocol (PTP) time stamp used as a time reference for a network; and locking phase of the AV data to align phase of the AV data based on the one or more time markers.

In an aspect of the disclosure, a node for timing synchronization of audio video (AV) data, comprising: a receiver configured to receive the AV data encoded with one or more time markers, wherein the one or more time markers are indexed to a precision time protocol (PTP) time stamp used as a time reference for a network a timing module configured to lock phase of the AV data based on the one or more time markers.

In an aspect of the disclosure, a computer-readable medium storing computer executable code for timing synchronization of received audio video (AV) data encoded with one or more time markers, the one or more time markers are indexed to a precision time protocol (PTP) time stamp used as a time reference for a network, the computer readable media comprising code to: lock phase of the AV data to align phase of the AV based on the one or more time markers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
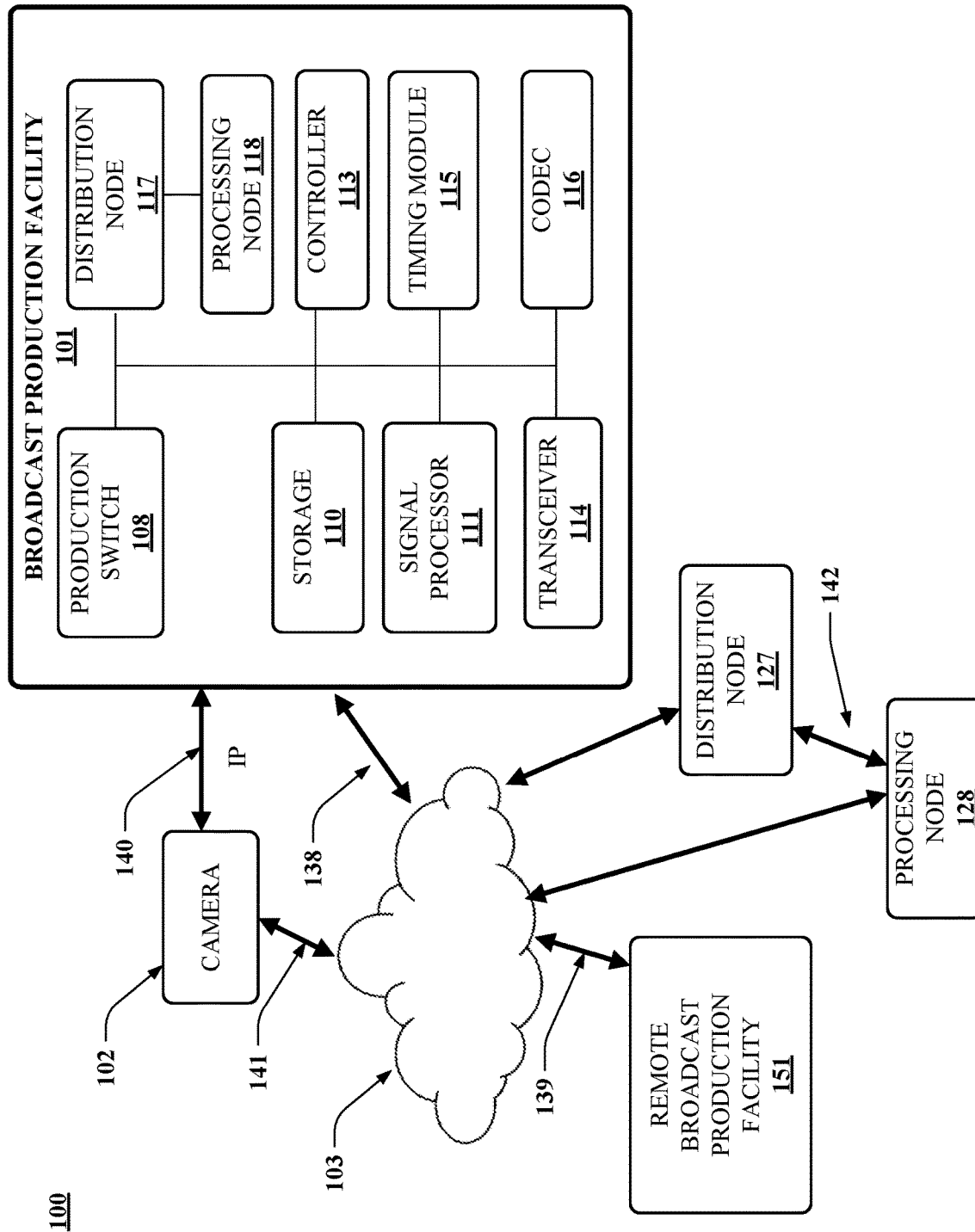
FIG. 1 is a diagram illustrating a media network with a broadcast production facility, a remote camera, and a remote production facility.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Propagation delays of media packets due to electrical connections, device processing, and conductor impedance of network links and the like may offset the phase of downstream media devices. For example, surround sound audio media may include four or five channels that may be streamed to a downstream media device through independent paths. As such, the phase of each audio channel at arrival to a media receiver may differ which can result in microsecond delays at the decoder in synchronization for one or more of the surround sound channels. In instances when audio packets are out of sync with video packets, tuning the decoder to advance or delay the audio may be necessary to synchronize lip movement to audio signals. To date, tuning and synchronizing the frequency and phase of a decoder at a media device has been a significant challenge in television broadcasting, particularly, with respect to a master media timing source.

The present aspects relate to a technique of timing synchronization of packetized audio and video (AV) data in a network. In particular, the technique includes distributing, at an apparatus, a packetized AV data encoded with time markers to a plurality of processing nodes. For example, the apparatus may be configured as a controller, an AV master and/or a transmitter implemented as a distributed function. The apparatus may be a receiver for a distribution node or a processing node for receiving the packetized AV data. In order to accurately synchronize frequency and phase components, one or more time markers may be indexed to a precision time protocol (PTP) time stamp used as a time reference. In some aspects, the receiver includes a phase lock loop (PLL) to lock phase of the packetized AV data. As such, the receiver may automatically advance or delay one or more inputs of AV media streams.

One approach is for a media receiver (e.g., controller/encoder) to determine the delay based on query of the network connections. The media receiver (e.g., controller/encoder) may determine (e.g., calculate) the worst case path (e.g., longest delay) using standard methods. Based on the worst case path (e.g., longest delay) the receiver (e.g., controller/encoder) may adjust the phase of one or more media components.

In some aspects, the transmitter may receive feedback from the receiver and adjust the phase of the transmitted packetized AV data. For example, a media receiver (e.g., media controller/encoder) may determine the delay based on query of the network connections and calculate the worst case path (e.g., longest delay) using standard methods. In turn, the media receiver (e.g., controller/encoder) may provide the transmitter (e.g., controller/AV master) with a report that includes the worst case path (e.g., longest delay). Based on the worst case path (e.g., longest delay) the transmitter (e.g., controller/AV master) may adjust the phase of one or more inputs of AV media prior to transition (e.g., distribution). In video for example, the transmitter (e.g., controller/AV master) may adjust to a common alignment point (e.g., a real-time based time marker aligned to line 1, pixel 1).

FIG. 1 is a diagram illustrating a media processing network 100 with broadcast production facility 101, remote camera 102, remote distribution node 127, processing node 128, and remote production facility 151. In an aspect, media processing network 100 may be a media network for real-time production and broadcasting of video and audio. Media processing network 100 may include the internet 103 and hardware conducive to internet protocol (IP). That is, aspects of Media processing network 100 may be network servers and network devices configures to transmit and receive video and audio signals of various formats. For example, in an aspect, broadcast production facility 101 may receive video and audio signals of various formats. It should be appreciated that broadcast production facility 101 is not limited to IP.

As depicted in FIG. 1, broadcast production facility 101 may include production switch 108, storage 110, signal processor 111, controller 113, transceiver 114, timing module 115, codec 116, distribution node 117, and processing node 118. Broadcast production facility 101 may be a production setup for a broadcast entity and may include one or more distribution nodes (e.g., electronic devices) configured to distribute media content to one or more distribution nodes (e.g., remote media devices).

Production switch 108 is a distribution node for the media processing network 100 and may process over 100 inputs of AV media streams received from remote inputs. In some aspects, production switch 108 may receive an input AV media stream from remote camera 102 and route the input AV media stream to distribution node 117 for live broadcast content such as a for live news coverage.

Storage 110 may store digital media content. That is, in an aspect, storage 110 may be a hard disk (e.g., magnetic drive), flash memory, EEPROM, and the like configure to receive and store media content. For example, in some instances, remote camera 102 may pre-record media content (e.g., pre-recorded news/interview) to storage 110 for later processing and consumption.

Signal processor 111 may perform various corrections to the video signals. For instance, in an aspect, controller 113 may instruct the signal processor 111 to color correction (e.g., tone, red eye correction) and gamma correction.

Controller 113 may provide operator instructions to the components of the broadcast production facility 101. In an aspect, controller 113 may be configured to direct certain media (e.g., audio and video) feed to a particular destination in the media processing network 100. For example, controller 113 may instruct the production switch 108 to stream media content from remote camera 102 via internet 103 to processing node 128 for consumer consumption. In an aspect, controller 113 may provide control instructions to the timing module 115 for sending the system offset value to codec 116 for encoding in the video data signals.

Transceiver 114 may process layer 7 (L7 of the OSI protocol stack typically contains the media payload) signals encoded by codec 116. For example, in an aspect, transceiver 114 may process L7 signals for transmission over IP (L3 of the OSI protocol stack) for consumer device distribution (e.g., cable TV, RF transmission, satellite TV, etc.) and for receiving L7 signals from the consumer device network.

Timing module 115 manages one or more time markers and time reference for the media processing network 100, and may determine a system offset value so that buffers in network devices may be set appropriately to handle a worst case timing delay in the distributed video signals. In an aspect, timing module 115 may extract a real-time based time stamp (e.g., a PTP time stamp) from internet 103, and format the time stamp for encoding by codec 116 into the audio video data stream.

Codec 116 performs encoding of video and audio data into data packets for transmission over IP in the media processing network 100. In some examples, codec 116 may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

Distribution node 117 may distribute network AV data throughout the broadcast production facility 101 to one or more processing node(s) 118. As depicted, in an aspect, distribution node 117 may distribute media content to processing node 118.

Remote distribution node 127 may feed remote processing node(s) 128 via a direct link 142, or via internet 103 connection. Examples of remote distribution node(s) 127 and processing node(s) 128 may include remote production switches similar to production switch 108 or remote signal processors similar to signal processor 111.

As depicted in FIG. 1, remote camera 102 may be an IP device, configured for the AV feed to the broadcast production facility 101 to use IP over an Ethernet connection 140. In an aspect, remote camera 102 may be configured for an AV feed across links 141 and 138 via the internet 103. As with all network nodes in media processing network 100, remote camera 102 may receive time stamp broadcasts from the broadcast production facility 101 to achieve mutual precision timing with the entire network.

Remote production facility 151 may include some or all of the same components of broadcast production facility 101. For frequency and phase syncing, either the remote production facility 151 or the broadcast production facility 101 may act as the AV master for broadcasting time stamps to the media processing network 100 nodes. Remote production facility 151 may exchange transmissions with the broadcast production facility 101 across an internet 103 connection via links 138, 139. Aspects of implementing the remote production facility 151 may include a live production setup on location at a sports or entertainment venue, where multiple remote cameras 102 and audio recorders may feed through controllers at the remote production facility 151 and fed to broadcast production facility 101 for media broadcasting.

Figure 2:
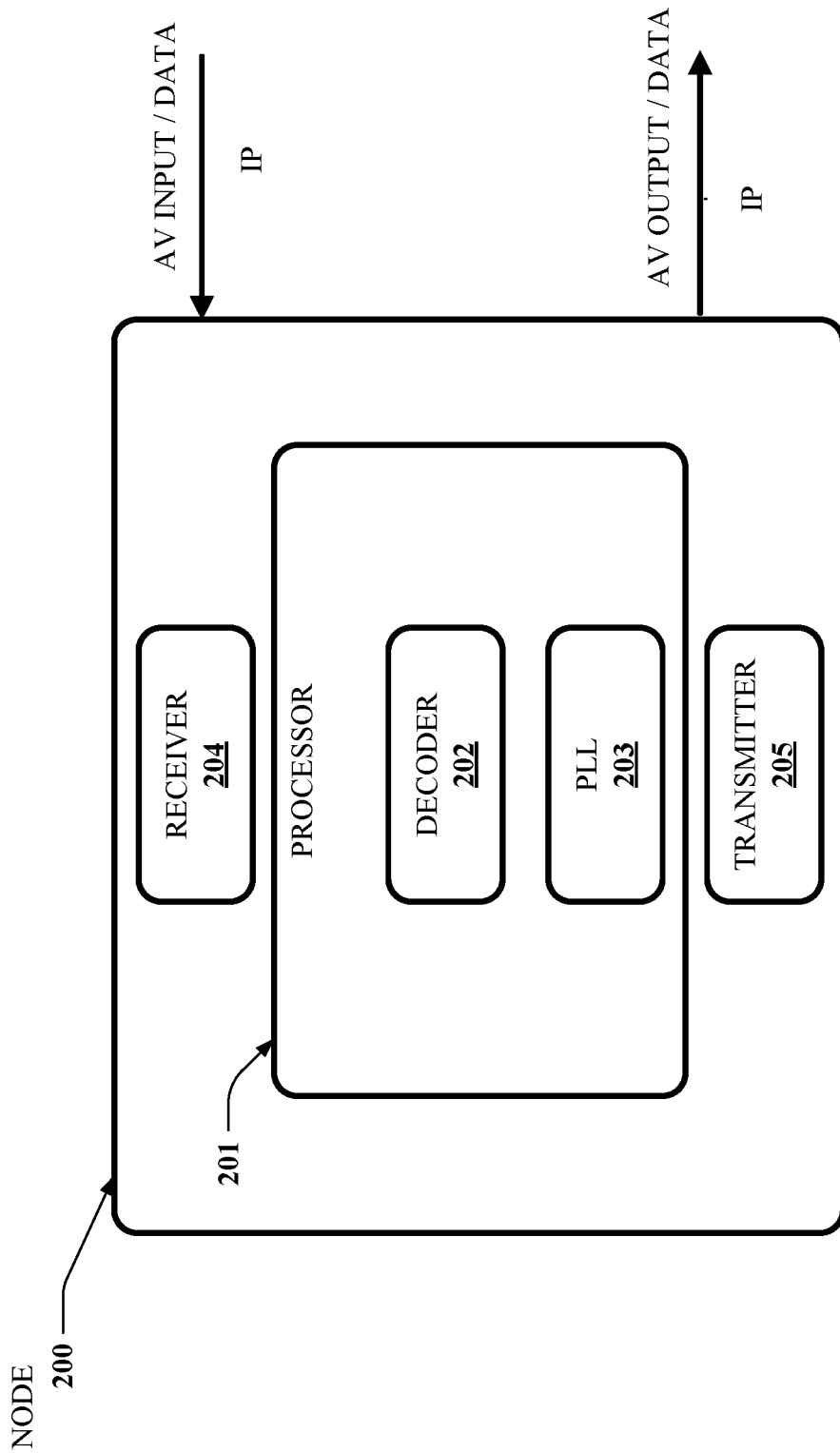
FIG. 2 is a diagram illustrating one configuration of a node within a media network.

FIG. 2 is a diagram illustrating one configuration of a processing node 200 within a media processing network 100. In some aspects, processing node 200 may be an implementation of a processing node such as a receiver (e.g., distribution node 117, processing node 118) or a distribution node such as production switch 108. As depicted in FIG. 2, processing node 200 may include processor 201, decoder 202, PLL 203, receiver 204, and transmitter 205. In some aspects, processing node 200 may receive at receiver 204 one or more inputs of AV media stream. That is, AV media data may be packetized and delivered via different paths. As such, each AV media data packet may have a different phase associated with a delay.

As depicted in FIG. 2, processor 201 is configured to process the AV data input received from an upstream node. In particular, processor 201 may be configured to determine the phase from one or more time markers encoded in each AV media data packet. In an aspect, processor 201 is configured to determine absolute phase offset values for each AV media data packet. In an aspect, the largest absolute phase offset values corresponds to the worst case absolute phase offset value and is the selected as the system offset value. In some aspects, processor 201 may be configured to set a media buffer (e.g., ROM, RAM, flash memory, EEPROM) to prevent overflow for implementing the worst case absolute phase offset value as an offset in the processing node 200.

In an aspect, processor 201 may provide transmitter 205 with feedback data that includes the system offset value. In some aspects, transmitter 205 may transmit the feedback data that includes the system offset value so that AV master may receive transmitter, a report from processing node 200 including the worst case absolute phase offset value and adjusting the phase for one or more AV data packets based on the report. This may beneficially adjust a system wide offset and reduce the amount of offset applied to each processing node.

In an aspect, processing node 200 may include decoder 202. Decoder 202 may decode each of the AV data packets to extract a time reference marker that is indexed to a real-time based time stamp (e.g., a universal time stamp generated remotely, such as a PTP time stamp). In some aspects, as depicted in FIG. 2, decoder 202 may be part of processor 201. In some aspects, decoder 202 may include application specific circuitry that is separate from processor 201.

PLL 203 is a phase lock loop that extracts the clock for the media from the time markers and determines a phase offset of the AV data signal decoded by decoder 202 compared to the original AV data signal sent by transceiver 114. In some aspects, processor 201 may include PLL 203 as depicted in FIG. 2. In some aspects, PLL 203 may include application specific circuitry that is separate from processor 201.

Figure 3:
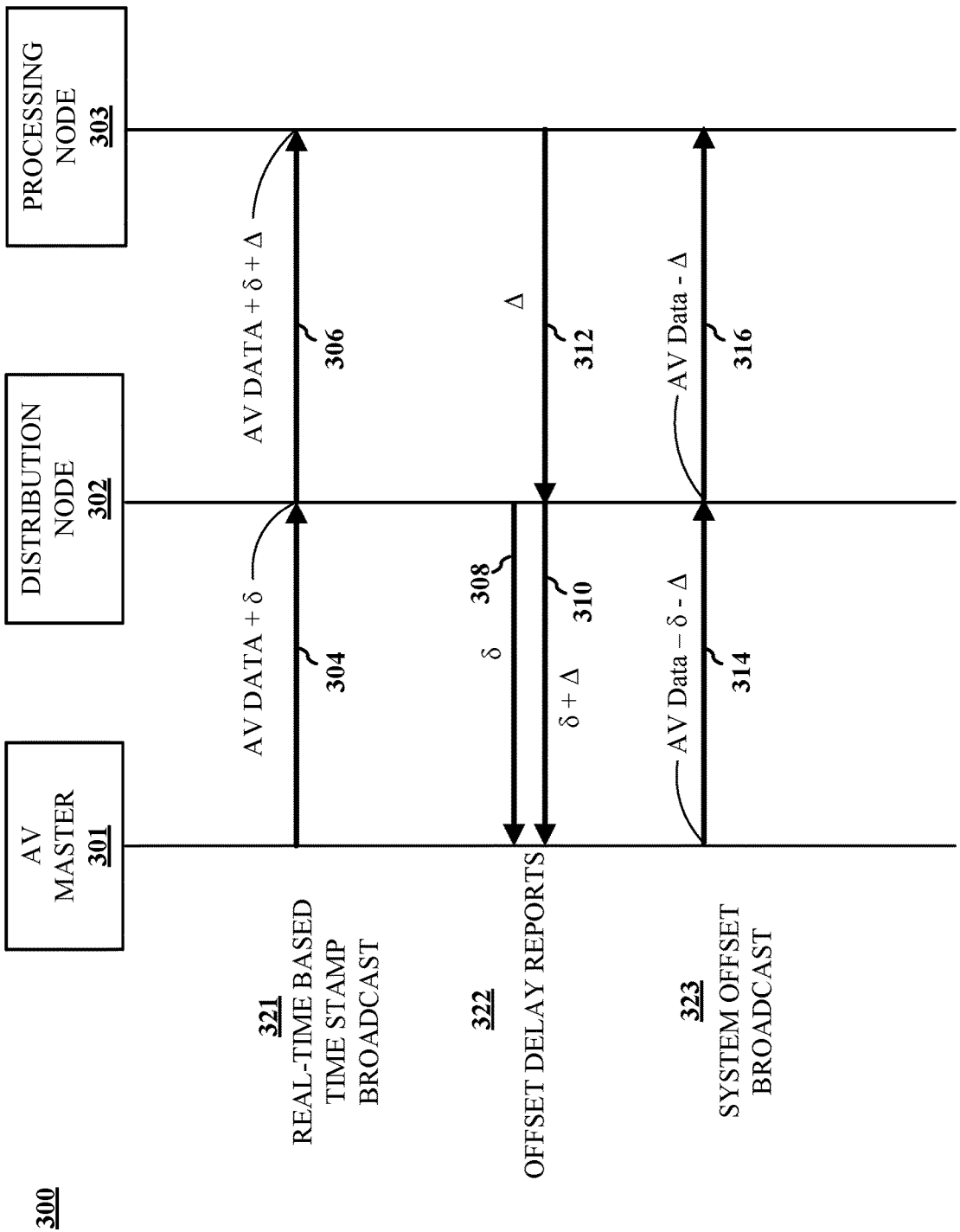
FIG. 3 is a signal diagram that illustrates broadcasting a time stamp and distributing timing offset values.

FIG. 3 is a signal diagram that illustrates broadcasting a time stamp and distributing timing offset values. In a broadcast network having a master timing component, shown as AV master 301, and a plurality of distribution nodes represented by distribution node 302, and a plurality of processing nodes represented by processing node 303, time stamps and offset delays may be distributed as follows. AV master 301, such as a transmitter at a broadcast production facility, may send a time stamp broadcast 321 periodically to all network nodes, such as distribution node 302 and processing node 303. As shown, processing node 303 may receive the broadcast from distribution node 302. Each network node then may determine the offset delay measured at that node, and then send individual offset delay reports 322 back to the AV master 301. For example, path 304 measures AV data plus an additional delay of δ between AV master and distribution node 302. In turn, distribution node 302 may report back a delay of δ between AV master and distribution node 302 as indicated in path 308. Likewise, path 306 measures AV data plus an additional delay of Δ between distribution node 302 and processing node 303. In turn, processing node 303 may report back a delay of Δ between distribution node 302 and processing node 303 as indicated in path 312.

The AV master 301 may evaluate all individual offset delays throughout the network as received in the individual offset delay reports 322, and determine a system offset value based on a worst case offset delay value. The worst case offset delay value is applied to a line buffer setting assuring that any network device can manage it. In an aspect, the path with the largest delay, which corresponds to the worst case absolute phase offset value, may be path 308 and 312 that reports back as path 310 corresponding to delay (δ+Δ). In an aspect, the AV master 301 may send a system offset broadcast 323 to all network nodes so that line buffers may be set to a number of buffered lines. For example, based on the report that indicates that path 310 corresponding to delay (δ+Δ) is the worst case absolute phase offset value. AV master 301 may determine a system offset value of delayed (δ+Δ). In this instance, as depicted in FIG. 3, the offset value at AV master 301—(δ+Δ). Thus, after delay, the offset value at distribution node 302 is—(Δ), which synchronizes the processing node 303 with no offset value.

Figure 4:
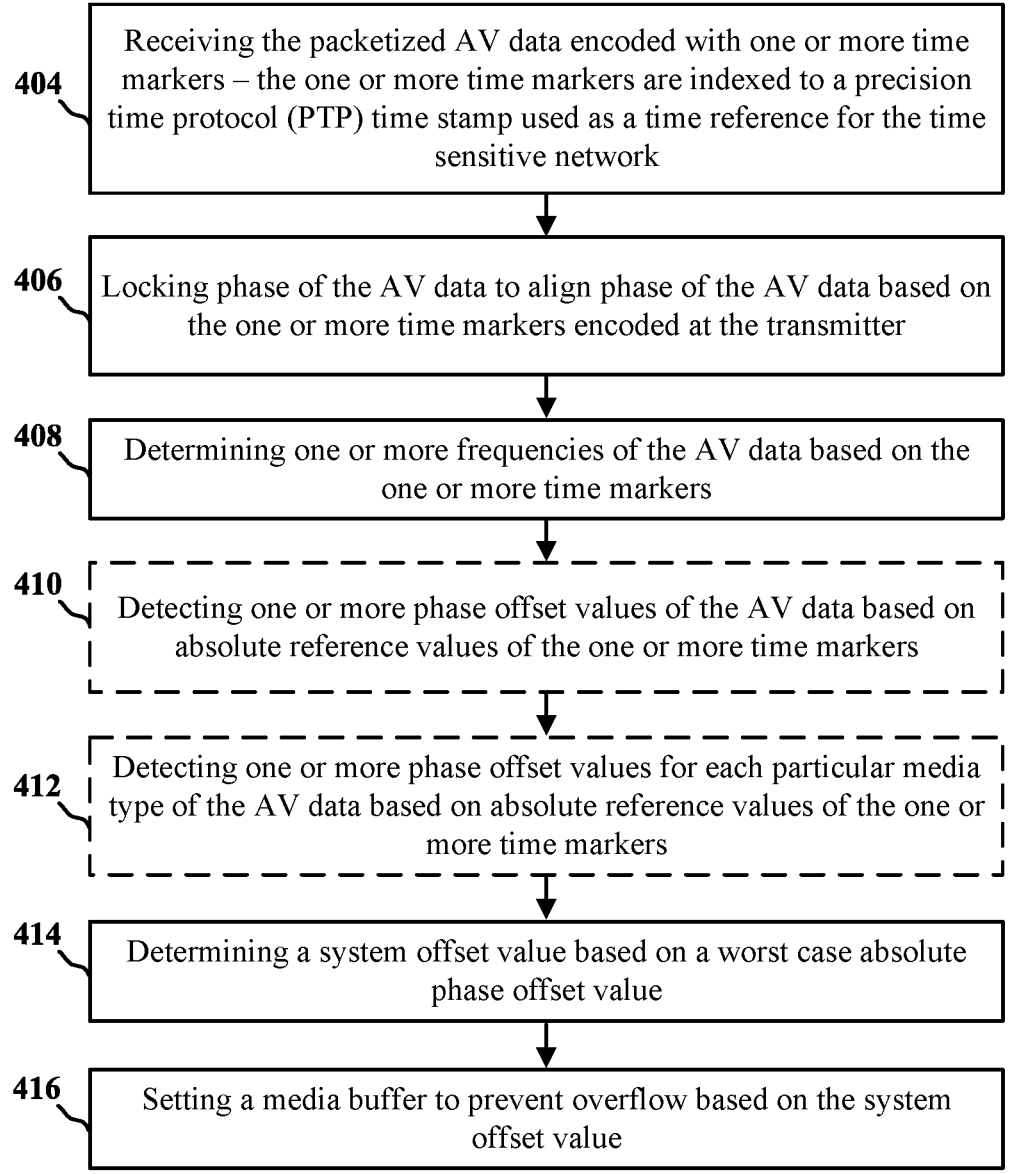
FIG. 4 is a flowchart of a method for precision timing of a broadcast network.

FIG. 4 is a flowchart of a method 400 for precision timing of a broadcast network. In some aspects, the broadcast network is a system for timing synchronization of packetized audio video (AV) data in a media network (e.g., media processing network 100) for phase locking a network node or receiver to an AV master, which is the source of the AV data transmission, and for receivers/network nodes setting their line buffers according to a system offset delay value. The system in the network (e.g., media processing network) 100 may include transmitter such as a processing node 128 and receiver such as AV master 301.

In an aspect, at block 404, the system for timing synchronization receives the AV data encoded with one or more time markers, wherein the one or more time markers are indexed to a precision time protocol (PTP) time stamp used as a time reference for a network. The one or more time markers may be indexed to a precision time protocol (PTP) time stamp used as a time reference for the network. For example, prior to transmission AV master may encode each AV data packets with one or more times stamps. The "time stamp" may be a PTP time stamp which is indexed to a universal coordinated time (UTC) value, or any similar time stamp based on a real-time value. As such, each time stamp is based on an absolute reference value. In addition, the time stamp may be distributed in the L2 ethernet header or in the L4 RTP signal header, as examples. For example, as depicted in FIG. 3, processing node 303 receives AV data from AV master 301 via path 304 and path 306.

In an aspect, at block 406, the system for timing synchronization locks phase of the AV data to align phase of the AV data based on the one or more time markers encoded at the transmitter (e.g., AV master). That is, the receiver (e.g., processing node) receives the AV data and the encoded one or more time markers. In some instances, a controller at the receiver may determine the absolute reference value of the time marker and provide these values to the PLL so that the receiver may advance or delay the timing in order to lock the phase.

In an aspect, at block 408, the system for timing synchronization determines one or more frequencies of the AV data based on the one or more time markers. That is, a controller or processor at the receiver may be configured to determine the difference between one or more time markers in order to determine one or more frequencies of the of the AV data. In some instances, the difference in time stamps in a single AV packet may correspond to x nanoseconds which in turn may be converted to frequency based on the bit rate.

In an optional aspect, at block 410, the system for timing synchronization detects one or more phase offset values of the AV data based on absolute reference values of the one more time markers. For example, a controller at the receiver may determine the absolute reference value of the time marker and subtracting the largest absolute reference value from the smallest absolute reference value may yield a worst case offset value. In another example, ordering the absolute reference values of the time markers from largest to smallest provides one or more an indication of one or more phase offset values.

In an optional aspect, at block 412, the system for timing synchronization detects one or more phase offset values for each particular media type of the AV data based on absolute reference values of the one or more time markers. That is, a controller at the receiver may determine the absolute reference value of the time marker and subtracting the largest absolute reference value of a particular type of media (e.g., audio only) from the smallest absolute reference value of a particular type of media (e.g., audio only) may yield a worst case offset value for a particular media type (e.g., audio only). In another example, ordering the absolute reference values of the time markers from largest to smallest for each particular type of media (e.g., audio only) provides one or more an indication of one or more phase offset values for a particular media type (e.g., audio only). This is beneficial in that separating by media type may better utilize resources since the offset may be different for each media type (e.g., audio packet delay differs from video packet delay).

In an aspect, at block 414, the system for timing synchronization determines a system offset value based on a worst case absolute phase offset value. Similar to block 410 and block 412, a controller at the receiver may determine the absolute reference value of the time marker and subtracting the largest absolute reference value from the smallest absolute reference value may yield a worst case offset value. This is depicted in path 312 and path 310 (FIG. 3) that provide the largest time difference of (Δ+δ), which corresponds to the worst case offset value.

In an aspect, at block 416, the system for timing synchronization sets a media buffer to prevent overflow based on the system offset value. That is, given the magnitude of the worst case offset value, the controller of the receiver allocates sufficient memory buffer space to accommodate the synching and tuning based on the offset value. Sufficient buffer space accommodates delaying AV data packet for synchronization and ensuring that sufficient space is allocated prevents overflow which could resulting "skipping" or jumbled media when played.

Figure 5:
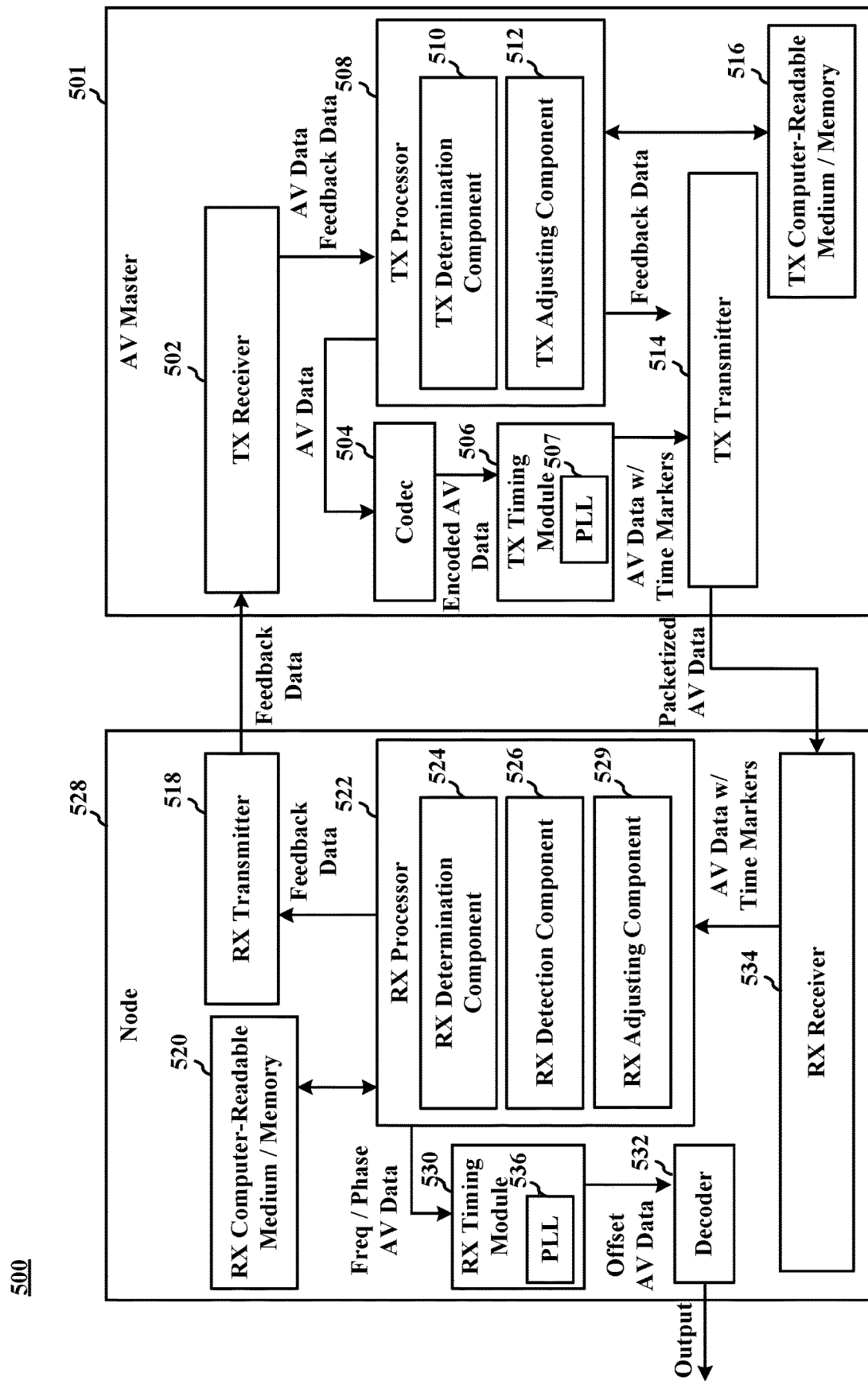
FIG. 5 is a conceptual data flow diagram illustrating the data flow between different means/components in a media processing system for timing synchronization.

FIG. 5 is a conceptual data flow diagram illustrating the data flow between different means/components in a media processing system for timing synchronization 500. The AV master 501 may be a processing node 128 and node 528 may be AV master 301 that are part of a media processing network 100. The AV master 501 includes TX receiver 502, TX computer readable medium/memory 516, TX processor/controller 508, codec 504, TX timing module 506, and TX transmitter 514. TX processor/controller 508 further includes a TX determination component 510 and TX adjusting component 512. The node 528 includes RX transmitter 518, RX computer readable medium/memory 520, RX processor/controller 522, RX timing module 530, decoder 532, RX receiver 534, and PLL 536. RX processor/controller 522 further includes a RX determination component 524, RX detection component 526, and RX adjusting component 529. In one aspect, at AV master 501, TX transmitter 514 is configured to distribute the AV data encoded with one or more time markers to a plurality of processing nodes. The one or more time markers are indexed to a precision time protocol (PTP) time stamp used as a time reference for the network. In this configuration, at node 528, RX receiver 534 is configured to receive the AV data. In addition, PLL 536 is configured lock phase of the AV data to align phase of the AV data at node 528 with the AV data at AV master 501 based on the one or more time markers received in the AV data.

In configuration, at node 528, RX processor/controller 522, particularly, RX determination component 524 is configured to determine one or more frequencies of the AV data corresponding to the transmitter based on the one or more time markers. In one optional configuration, at node 528, RX processor/controller 522, particularly, RX detection component 526 is configured detect one or more phase offset values of the AV data based on absolute reference values of the one more time markers. In one optional configuration, at node 528, RX processor/controller 522, particularly, RX detection component 526 is configured to detect one or more phase offset values for each particular media type of the AV data based on absolute reference values of the one or more time markers. In one configuration, at node 528, RX processor/controller 522, particularly, RX determination component 524 is configured to determine a system offset value based on a worst case absolute phase offset value. In some configurations, RX processor/controller 522, particularly, RX determination component 524 may be configured to provide the frequency and phase to RX timing module 530, which in turn provides the offset value to decoder 532. In addition, RX timing module includes PLL 536 that assists in reducing jitter as well as phase alignment. Decoder 532 provides the synched media content with an output to a display or other electronic device for consumption. In such a configuration, at node 528, RX processor/controller 522, particularly, RX adjusting component 529 is configured to set a media buffer to prevent overflow based on the system offset value. In some instances the media buffer may be computer readable medium/memory 520. In one configuration, at AV master 501, TX receiver 502 is configured to receive a report (e.g., feedback data) from each of the processing nodes including the worst case absolute phase offset value. In such a configuration, at AV master 501, TX processor/controller 508, particularly, TX adjusting component 512 is configured to adjust the phase based on the report. In some configurations the system offset value is based on a number of video lines. As depicted in FIG. 5, TX processor/controller 508, particularly, TX determination component 510 may be configured to provide AV data to codec 504, which in turn encodes AV data to TX timing module 506. As such, TX timing module 506 may encode time markers into the AV data. In addition, TX timing module includes PLL 507 that assists in reducing jitter as well as phase alignment. In some instances, the one or more time markers are indexed to a precision time protocol (PTP) time stamp used as a time reference for the network.

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C § 112(f) unless the element is expressly recited using the phrase "means for."

What is claimed is:

1. A system for timing synchronization of audio video (AV) data, the system comprising
a receiver configured to receive an AV stream with a plurality of data packets having the AV data and each being encoded with a time marker that is indexed to a precision time protocol (PTP) time stamp used as a time reference for a media stream network;
a timing module configured to determine a phase of the AV data based on the time marker in each respective data packet to align the phase of the AV data with the time reference for the media stream network;
a controller configured to determine a system offset value based on a worst case absolute phase offset value of the AV data and set a media buffer based on the determined system offset value to prevent overflow of the AV data;
wherein the controller is configured to determine a frequency of the AV data based on the time marker;
wherein the controller is configured to detect a phase offset value of the AV data based on an absolute reference value of the time marker to determine the worst case absolute phase offset value;
wherein the AV data comprises a plurality of different types of media streams, the time marker comprises a plurality of time markers, and the controller is configured to detect a plurality of different phase offset values for each of the plurality of different types of media streams of the AV data based on absolute reference values of the plurality of time markers.

2. The system of claim 1, wherein the timing module includes a processor configured to execute instructions stored in memory to determine the phase of the AV data, and the controller includes a processor configured to execute instructions stored in memory to determine the system offset value, set the media buffer based on the determined system offset value, determine the frequency of the AV data, and detect the phase offset value of the AV data.

3. The system of claim 1, wherein the controller is further configured to set the media buffer by reserving sufficient space in the media buffer to accommodate the AV data delayed during transmission in the media stream network to prevent overflow during media playout of the AV data.

4. The system of claim 1, wherein the timing module includes a phase lock loop configured to lock the phase of the AV data.

5. A system for timing synchronization of media streams in a media stream network, the system comprising
a receiver configured to receive a media stream with a plurality of data packet that are each encoded with a time marker that is indexed to a precision time protocol (PTP) time stamp used as a time reference for a media stream network;
a timing module configured to determine a phase of the media stream based on the time marker in each respective data packet, to align the phase of the media stream with the time reference for the media stream network;
a controller configured to determine a system offset value based on a worst case absolute phase offset value of the media stream and set a media buffer based on the determined system offset value to prevent overflow of the media stream.

6. The system of claim 5, wherein the media stream comprises audio video (AV) data.

7. The system of claim 5, wherein the controller is configured to determine a frequency of the media stream based on the time marker.

8. The system of claim 5, wherein the controller is configured to detect a phase offset value of the media stream based on an absolute reference value of the time marker to determine the worst case absolute phase offset value.

9. The system of claim 5, wherein the media stream comprises a plurality of different types of media streams, the time marker comprises a plurality of time markers, and the controller is configured to detect a plurality of different phase offset values for each of the plurality of different types of media streams based on absolute reference values of the plurality of time markers.

10. The system of claim 5, wherein the timing module includes a processor configured to execute instructions stored in memory to determine the phase of the media stream, and the controller includes a processor configured to execute instructions stored in memory to determine the system offset value and set the media buffer based on the determined system offset value.

11. The system of claim 5, wherein the controller is further configured to set the media buffer by reserving sufficient space in the media buffer to accommodate delays experienced by the media stream during transmission in the media stream network to prevent overflow during media playout of the media stream.

12. The system of claim 5, wherein the timing module includes a phase lock loop configured to lock the phase of the media stream.

13. A system for synchronizing media streams in a media stream network comprising:
a media stream time marker alignment module configured to align phase of a media stream having a plurality of data packets comprising media data based on a time marker encoded in each data packet and that is indexed to a common time reference for the media stream network; and
a controller configured to determine an offset value based on a phase offset value of the media stream and set a buffer based on the determined offset value to control timing of aligning phase of the media stream so as to prevent misaligned flow of the media stream in a media stream network.

14. The system of claim 13, wherein the media data of the media stream comprises audio video (AV) data.

15. The system of claim 13, wherein the offset value comprises a system offset value.

16. The system of claim 13, further comprising a receiver configured to receive the media stream with the plurality of data packets encoded with the time marker.

17. The system of claim 13, wherein the phase offset value of the media stream comprises an absolute phase offset value of the media stream.

18. The system of claim 13, wherein the media stream time marker alignment module is configured to lock phase of the media stream based on the time marker.

19. The system of claim 13, wherein the common time reference for the media stream network comprises a universal coordinated time value.

20. The system of claim 17, wherein the absolute phase offset value comprises a worst case absolute phase offset value of the media stream.

21. The system of claim 13, wherein control timing of aligning phase synchronization of the media stream comprises delaying timing of aligning phase of the media stream.

22. The system of claim 13, wherein the time marker is indexed to a precision time protocol (PTP) time stamp used as a time reference for the media stream network.

23. The system of claim 13, wherein prevent misaligned flow of the media stream comprises prevent overflow of the media stream.

24. The system of claim 13, wherein the controller is configured to determine a frequency of the media stream based on the time marker.

25. The system of claim 20, wherein the controller is configured to detect a phase offset value of the media stream based on an absolute reference value of the time marker to determine the worst case absolute phase offset value.

26. The system of claim 13, wherein the media stream comprises a plurality of different types of media streams, the time marker comprises a plurality of time markers, and the controller is configured to detect a plurality of different phase offset values for each of the plurality of different types of media streams based on absolute reference values of the plurality of time markers.

27. The system of claim 13, wherein the media stream time marker alignment module includes a processor configured to execute instructions stored in memory to align phase of the media stream, and the controller includes a processor configured to execute instructions stored in memory to determine the offset value and set the buffer based on the determined offset value.

28. The system of claim 13, wherein the controller is further configured to set the buffer by reserving sufficient space in the buffer to accommodate the media stream delayed during transmission in the media stream network to prevent overflow during media playout of the media stream.

29. The system of claim 18, wherein the timing module includes a phase lock loop configured to lock the phase of the media stream.

30. The system of claim 13, wherein the controller is further configured to prevent the misaligned flow of the media stream in the media stream network by adjusting a phase of an input of the media stream prior to distribution and media playout of the media stream.

* * * * *